(12) United States Patent
Huber et al.

(10) Patent No.: US 9,080,857 B2
(45) Date of Patent: Jul. 14, 2015

(54) DEVICE FOR INTERFERENTIAL DISTANCE MEASUREMENT

(75) Inventors: Walter Huber, Traunstein (DE); Birgit Lange, Lubeck (DE); Michael Hermann, Tacherting (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 390 days.

(21) Appl. No.: 13/065,369

(22) Filed: Mar. 21, 2011

(65) Prior Publication Data
US 2011/0235051 A1    Sep. 29, 2011

(30) Foreign Application Priority Data

Mar. 23, 2010  (DE) .......................... 10 2010 003 157

(51) Int. Cl.
  *G01B 11/02* (2006.01)
  *G01B 11/14* (2006.01)
  *G01D 5/347* (2006.01)
  *G01D 5/38* (2006.01)

(52) U.S. Cl.
  CPC ............ *G01B 11/14* (2013.01); *G01D 5/34746* (2013.01); *G01D 5/38* (2013.01)

(58) Field of Classification Search
  USPC .................................. 356/494, 499, 505, 521
  See application file for complete search history.

(56) References Cited

U.S. PATENT DOCUMENTS

| 5,011,287 | A | * | 4/1991 | Mino ............................ 356/496 |
| 5,661,295 | A | * | 8/1997 | Fukui et al. .............. 250/231.14 |
| 5,678,319 | A | * | 10/1997 | Huber .............................. 33/707 |
| 7,019,842 | B2 | * | 3/2006 | Holzapfel et al. ............ 356/499 |

FOREIGN PATENT DOCUMENTS

DE    10 2007 016 774 A1    10/2008

OTHER PUBLICATIONS

Schmitz, M., et al., "Gratings in the Resonance Domain as Polarizing Beam Splitters," Optics Letters, vol. 20, No. 17, Sep. 1, 1995, pp. 1830-1831.

* cited by examiner

*Primary Examiner* — Tariifur Chowdhury
*Assistant Examiner* — Jonathon Cook
(74) *Attorney, Agent, or Firm* — Brinks Gilson & Lione (57) ABSTRACT

A device for interferential distance measurement that includes a light source that emits a light beam along a propagation direction and a scanning plate including a splitter that splits the light beam into a measurement beam and a reference beam. The device further including a reflector disposed spaced-apart in a direction of the propagation direction and a detector element. The measurement beam and the reference beam are propagated from the splitter along different optical paths toward the reflector, where a back reflection of the measurement beam and the reference beam occurs at the reflector toward the scanning plate. In addition, at a combining location the measurement beam and the reference beam attain interfering superposition, and wherein the measurement beam and the reference beam interfering at the combining location are detected by the detector element so that the detector element generates a distance signal regarding a distance between the scanning plate and the reflector.

27 Claims, 5 Drawing Sheets

DEVICE FOR INTERFERENTIAL DISTANCE MEASUREMENT

Applicants claim, under 35 U.S.C. §119, the benefit of priority of the filing date of Mar. 23, 2010 of a German patent application, copy attached, Serial Number 10 2010 003 157.7, filed on the aforementioned date, the entire contents of which is incorporated herein by reference.

BACKGROUND OF THE INVENTION

1. Field of the Invention

The present invention relates to a device for interferential distance measurement.

2. Discussion of Related Art

One such device is known from German Patent Disclosure DE 10 2007 016774 A1, for example. It includes a light source and a scanning element or scanning plate in the form of a transparent glass plate. A splitter is disposed on the glass plate and splits the beam, emitted by the light source, into at least one measurement beam and at least one reference beam. A reflector is also provided spaced apart in the direction of the propagation direction of the beams. Via one or more detector elements, the resultant interference signals are detected. The interference signals occur here as a result of the superposition of a measurement beam and a reference beam. The measurement beam is propagated in the direction of the reflector and is reflected back from there to the scanning plate. The reference beam is guided solely in the scanning plate and is finally brought into interfering superposition with the measurement beam. From the interference signals thus obtained, the distance between the scanning plate and the reflector, and the changes in distance between these components, can be ascertained in a known manner. Such devices may be used for instance in semiconductor production equipment, for instance in order to make additional information available with regard to possible tilting, along with the two-dimensional displacement information with regard to a wafer table obtained via conventional position measuring instruments. A disadvantage of the known device from DE 10 2007 016774 A1 is now that the measurement beam and reference beam travel different travel lengths in various media; in particular, the reference beam is propagated nearly exclusively in the scanning plate. If therefore fluctuations in the wavelength of the radiation furnished by the light source result from changes in temperature, pressure or humidity for the measurement beam that is propagated in air, the consequence are errors in the distance determination, since precisely this wavelength functions as the measurement standard.

OBJECTS AND SUMMARY OF THE INVENTION

An object of the present invention is to create a device for interferential distance measurement which even in the event of fluctuating ambient conditions avoids mismeasurements as much as possible.

This object is attained according to the present invention by a device for interferential distance measurement that includes a light source that emits a light beam along a propagation direction and a scanning plate including a splitter that splits the light beam into a measurement beam and a reference beam. The device further including a reflector disposed spaced-apart in a direction of the propagation direction and a detector element. The measurement beam and the reference beam are propagated from the splitter along different optical paths toward the reflector, where a back reflection of the measurement beam and the reference beam occurs at the reflector toward the scanning plate. In addition, at a combining location the measurement beam and the reference beam attain interfering superposition, and wherein the measurement beam and the reference beam interfering at the combining location are detected by the detector element so that the detector element generates a distance signal regarding a distance between the scanning plate and the reflector.

According to the present invention, it is now provided that both the measurement beam and the reference beam are propagated along different optical paths in the direction of the reflector. There, a back reflection takes place in the direction of the scanning plate, where at a combining location the measurement beam and the reference beam attain interfering superposition. Via the at least one detector element, a distance signal from the interfering beams regarding the distance between the scanning plate and the reflector is detectable.

Preferably, via the first splitter of the scanning plate, splitting into two measurement beams and one reference beam takes place. The scanning plate further includes a second splitter, which split the reference beam into two partial reference beams. The two measurement beams and the two partial reference beams are each propagated along different optical paths in the direction of the reflector, where a back reflection in the direction of the scanning plate takes place. There, one measurement beam and one partial reference beam each, at two combining locations, attain interfering superposition. Via at least two detector elements, a first and a second distance signal from the respective interfering beams relating the distance between the scanning plate and the reflector are detectable.

A signal processing unit is moreover provided, which is embodied for determining a distance value between the scanning plate and the reflector which is independent of any tilting of the reflector, the value being obtained from the arithmetic averaging of distance values generated from the first and second distance signals.

It proves to be advantageous if a plurality of distance signals phase-shifted relative to one another are detectable via a plurality of detector elements.

Advantageously, the scanning plate includes a transparent glass plate, on whose side facing away from the reflector the first splitter is disposed.

It is possible for the second splitter to be disposed on the side of the glass plate facing toward the reflector.

The splitter may be embodied as a transmission diffraction grating.

Preferably, the light source, the at least one detector element, the scanning plate, and the signal processing unit are jointly disposed in the same scanning unit.

It is furthermore possible that at the combining location, a combining grating is disposed which splits the interfering beams striking it into a plurality of pairs of beams, which are propagated in different directions in space. One detector element is disposed in each of these directions in space. The grating parameters of the combining grating are selected such that via the detector elements a plurality of phase-shifted distance signals are detectable. It is furthermore possible that at the combining location, a combining grating is disposed which splits the interfering beams striking it into a plurality of pairs of beams, which are propagated in different directions in space. One detector element is disposed in each of these directions in space. The grating parameters of the combining grating are selected such that via the detector elements a plurality of phase-shifted distance signals are detectable.

It is furthermore possible for the first splitter means to be embodied such that the measurement beam and reference beam split by way of them are polarized orthogonally to one another.

The first splitter can be embodied as polarizing gratings

It is also possible that a plurality of polarization optical components are disposed between the combining location and the associated plurality of detector elements in such a way that via the detector elements, a plurality of phase-shifted distance signals are detectable.

It can furthermore be provided that a combining grating is disposed at the combining location, and the following components are disposed between the combining grating and the plurality of detector elements:
- a λ/4 plate, which is disposed at an angle of 45° to the measurement beams and reference beams polarized vertically to one another, which attain superposition at the combining grating;
- a splitting grating, downstream of the λ/4 plate, by way of such splitting grating the beam striking it splits into a plurality of partial beams, which are each propagated in the direction of the detector elements;
- a polarization filter, disposed upstream of each detector element;

and the orientations of the polarization filters for the various partial beams are selected differently, such that via the detector elements, a plurality of phase-shifted distance signals are detectable.

It can furthermore be provided that the first splitter is embodied as a grating having a first grating period; the second splitter is embodied as a grating having a second grating period. At the combining location, a combining grating having a third grating period is disposed; and the grating periods are selected differently from one another such that on the detector element, a periodic vernier fringe pattern results.

It is furthermore possible that the reflector is embodied of a transparent substrate body, on the side of which toward the scanning plate a transmission grating is disposed, and on the side opposite that, a reflection layer is disposed.

It should be mentioned as especially advantageous with regard to the embodiment according to the present invention that both the measurement beam and the reference beam or partial reference beam, which attain interfering superposition at the combining location, at a preferred set-point distance travel along the same optical travel distances. As a consequence, all the beams involved in obtaining signals are exposed to similar ambient factors (changes in temperature, pressure, and humidity), and in particular to the same fluctuations of the index of refraction in air, along the optical travel distances covered in the measurement gap. As a consequence, mismeasurements caused by resultant fluctuations in wavelength can be maximally avoided. In the device of the prior art discussed at the outset, such fluctuations would result if only some of these beams were affected. Because of the provisions of the present invention, markedly higher measurement accuracy thus results.

It should also be mentioned that in all the embodiments of the device of the present invention, it is ensured that the phase-shifted distance signals from a scanning are all derived from the same position of the reflector. In the device of the prior art discussed at the outset, different impact sites of the measurement beams with a different phase at the reflector occur, especially in the case of tilting of the reflector. That in turn leads to mismeasurements. In contrast, in the device of the present invention, the distance measurement is not impaired.

Further details advantages of the present invention will be described in the ensuing description of exemplary embodiments of the device of the present invention in conjunction with the drawings.

DETAILED DESCRIPTION OF THE PREFERRED EMBODIMENTS

Before various embodiments of the device of the present invention for interferential distance measurement is described in detail in conjunction with the various drawings, the fundamental principle common to all the variants will first be explained.

The device according to the present invention for interferential distance measurement includes first a light source, a scanning plate with a first splitter, which splits the beam emitted by the light source into at least one measurement beam and at least one reference beam, and one or more detector elements. In one possible embodiment, a second splitter and a signal processing unit are provided in addition. Furthermore, a collimator lens can be disposed upstream of the light source. These components are preferably disposed jointly in a scanning unit. Second, the device of the present invention also includes a reflector, which is disposed spaced apart from the scanning unit or in other words from the remaining components. The space between the scanning unit and reflector will hereinafter also be called the measurement gap. With the aid of the device of the invention, the distance or a change in distance between the scanning unit and the components disposed in it, on the one hand, and the reflector, on the other, can be ascertained with high precision via an interferential distance measurement.

For the interferential distance measurement, it must be ensured, by way of the disposition and/or embodiment of the various components of the scanning unit, that both a measurement beam and a reference beam or partial reference beam are propagated in the measurement gap along different optical paths in the direction of the reflector. In principle, all the beams that attain the interfering superposition travel along the distance covered through essentially the same media. From the reflector, the measurement beam and reference beam are reflected back in the direction of the scanning unit, or of the components disposed in it. At a combining location in the scanning unit, the measurement beam and the reference beam finally attain the interfering superposition. Via the at least one detector element, which is disposed downstream of the combining location in the light propagation direction, an interferential distance signal can be detected, if the distance between the scanning unit, and the components disposed in it, and the reflector changes. The interferential distance signal results from the optical paths traveled by the measurement beam and reference beam, and these paths vary to a variably great extent upon a change in distance.

The terms measurement beam and reference beam or partial reference beam for the beams that attain interference are also chosen arbitrarily here, since both beams, at a defined set-point distance, travel the same optical path and are reflected back to the scanning unit from the same impact site on the reflector. Accordingly, the terms used for the beams for obtaining signals could naturally be transposed.

The interferential distance signal thus obtained is a measurement value for possible resultant changes in distance. Accordingly, in the simplest embodiment the device embodied according to the present invention functions as a relative-measurement system. In principle, it is naturally also possible to expand the device of the present invention into an absolute measurement system, by making distance measurements with different light source wavelengths, and evaluating these measurements by the known nonius principle for determining an absolute distance between the scanning unit and the reflector.

Basically, it proves especially advantageous if the device of the present invention is embodied such that by way of the device of the present invention, by two interfering measurement beam and reference beam pairs, two separate distance signals are generated. These distance signals have signal periods which are dependent on the particular tilt angle of the reflector. In order always to determine the correct distance between the scanning unit, or the components disposed in it, and the reflector, it is provided that via a signal processing unit, an arithmetic average of the distance values resulting from the two distance signals, that is, a distance value, is generated which is independent of the tilt angle between the reflector and the scanning unit or the scanning plate. In that way, even if the reflector may become tilted, a correct distance determination can be ensured.

Moreover, with the aid of the two distance signals, information about possible tilting of the reflector about an axis can be obtained, the axis being oriented parallel to the lines indicating the divisions on the scanning plate. For that purpose, via the signal processing unit, the difference between the distance values generated from the distance signals is found and divided by the distance between the impact points on the reflector.

Via the device according to the present invention, it is now possible for the wavelength dependency of the distance signals, in particular, to be minimized markedly. This can be ascribed definitely to the chosen beam path of the measurement beam and reference beam as well as the defined embodiment of certain components in the scanning unit. Moreover, it can be ensured that the measurement beam and reference beam arriving at interference will travel identical optical path lengths for a predetermined set-point distance. Any drifts in the light source wavelength and possibly fluctuating ambient conditions, and wavelength fluctuations associated with them, now no longer have any influence on the measurement accuracy.

In order for the relative measurement to also have information available about the direction of the change in distance taking place, it is fundamentally necessary to generate a plurality of phase-shifted distance signals. For instance, three distance signals phase-shifted by 120° from each other, or four distance signals phase-shifted from one another by 90°, can be generated. To generate phase-shifted distance signals, fundamentally various options are available. The exemplary embodiments of FIGS. 1, 2, 3 and 4 explained below in detail differ essentially in how the phase-shifted distance signals are generated in the device of the invention. Basically, the beam path variant explained at the end in conjunction with FIG. 5 can be implemented using all three proposed options for generating phase-shifted distance signals.

Figure 1:
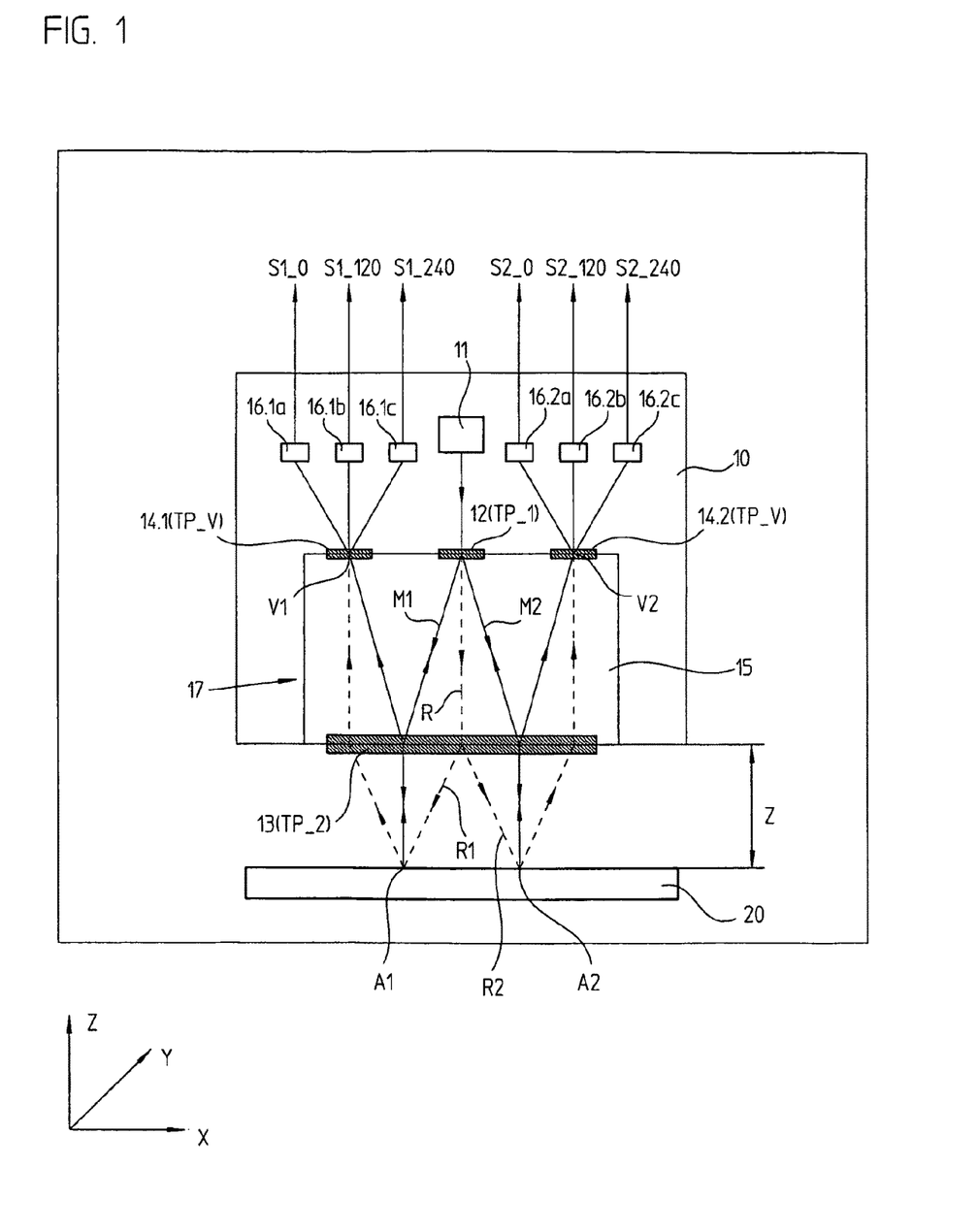
FIG. 1 is a schematic illustration of a first embodiment of a device in accordance with the present invention.
Figure 2:
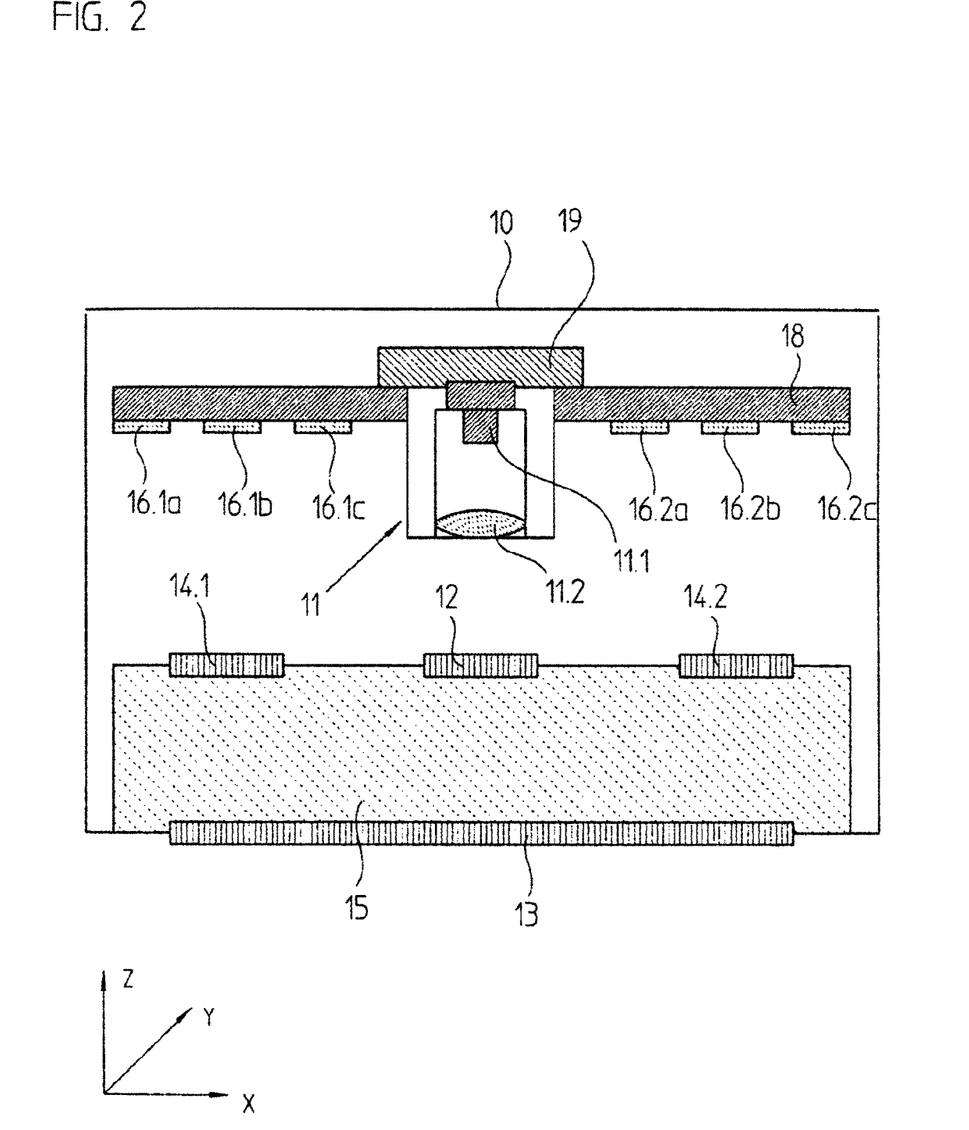
FIG. 2 is a schematic illustration of an embodiment of a scanning unit to be used with the device of FIG. 1.

From FIGS. 1 and 2, a first concrete embodiment of the device of the present invention will now be explained, which utilizes a first principle for generating phase-shifted distance signals. FIG. 1 schematically shows the scanning beam paths utilized for the distance measurement. FIG. 2, in a larger view, shows the scanning unit of this embodiment of the device of the present invention.

As already indicated above, the device of the present invention for interferential distance measurement includes a scanning unit 10, with a number of components disposed in it, as well as a reflector 20, embodied as a plane mirror, spaced apart from them by the distance Z. In the scanning unit 10, there are a light source 11 and a scanning plate 17, which includes a transparent glass plate 15 with a first splitter 12 and a second splitter 13 disposed on it. The first and second splitters 12, 13 are each embodied as a transmission diffraction grating, with suitably chosen first and second grating periods TP_1, TP_2. Two combining gratings 14.1, 14.2 associated with the scanning plate 17 and provided in the scanning unit 10 are also embodied as transmission diffraction gratings. The various gratings of the scanning plate 17 can be embodied as phase gratings, amplitude gratings, or combined phase and amplitude gratings. Downstream of each of the two combining gratings 14.1, 14.2, three detector elements 16.1$a$, 16.1$b$, 16.1$c$ and 16.2$a$, 16.2$b$, 16.2$c$, respectively are provided in the scanning unit 10.

The first splitter 12, that is, the corresponding transmission diffraction grating, as well as the two combining gratings 14.1, 14.2 are disposed on the top side of the transparent glass plate 15 of the scanning plate 17, or in other words on the side facing away from the reflector 20. The grating lines of the transmission diffraction gratings of the first splitter means 12 and the combining gratings 14.1, 14.2 extend with their longitudinal axes in the y direction indicated and are disposed periodically in the x direction indicated. The grating period TP_1 of the transmission diffraction grating of the first splitter 12, in one possible embodiment, amounts to TP_1=4 µm; the grating period TP_V of the combining gratings 14.1, 14.2 is chosen in accordance with TP_v=4 µm.

The second splitter 13, also embodied as a transmission diffraction grating, is disposed on the underside of the transparent glass plate 15 facing toward the reflector 20. As can be seen from FIG. 1, this transmission diffraction grating extends in the x direction over nearly the entire length of the underside of the scanning plate 17. The grating orientation is chosen to be identical to the orientation of the various gratings on the top side of the scanning plate 17. That is, the grating lines of the transmission diffraction grating of the second splitter 13 extend in the y direction and are disposed periodically with the grating period TP_2 in the x direction. In one possible embodiment, TP_2=4 µm.

The scanning beam path for generating the three phase-shifted distance signals S2_0, S2_120, S2_240 on the detector elements 16.2$a$, 16.2$b$, 16.2$c$ will now be explained. The beam emitted by the light source 11 first strikes the first splitter 12, where splitting occurs into two measurement beams M1, M2 and one reference beam R; the beam path of the reference beam R is indicated by dashed lines in FIG. 1. Via the first splitter 12 embodied as a transmission diffraction grating, a diffraction takes place in both a 0th order of diffraction (for reference beam R) and ±1st orders of diffraction (for the measurement beams M2, M1). The various split beams M1, M2 and R, after splitting, are propagated in the direction of the reflector 20.

The reference beam R then strikes the second splitter 13 on the underside of the scanning plate 17, where it is split into two partial reference beams R1, R2, which then spread onward in the direction of the reflector 20. Via the second splitter 13, also embodied as a transmission diffraction grating, splitting of the reference beam R takes place into a +1st order of diffraction (for the partial reference beam R1) and a −1st order of diffraction (for the partial reference beam R2).

The partial reference beam R2 finally strikes the reflector 20 at the impact site A2. From the impact site A2, the back reflection of the partial reference beam R2 takes place in the direction of the scanning unit 10 or the scanning plate 17. After another diffraction at the transmission diffraction grating of the second splitter 13 on the underside of the scanning plate 17, the partial reference beam R2 used for obtaining a signal is propagated in the direction of the combining location V2, on the top side of the scanning plate 17 where the combining grating 14.2 is disposed.

The measurement beam M2 on the right, generated by the first splitter 12, is diffracted via the transmission diffraction grating of the second splitter 13 on the underside of the scanning plate 17 and is then propagated vertically in the direction of the reflector 20. It too strikes the impact site A2 on the reflector 20 and is then reflected back in the direction of the scanning plate 17, or, in other words, in the direction of incidence. At the transmission diffraction grating of the second splitter on the underside of the scanning plate 17, a further diffraction takes place, before the measurement beam M2 used for obtaining the signal is likewise propagated in the direction of the combining location V2 on the top side of the scanning plate 17.

Finally, at the combining location V2, the measurement beam M2 and the partial reference beam R2, after traversing the various beam paths, attain the interfering superposition. Via the combining grating 14.2 placed at the combining location V2 and having the suitably selected grating period TP_V, three pairs of interfering beams are split up into three directions in space. In the corresponding three directions in space, three downstream detector elements 16.2a, 16.2b, 16.2c are placed spaced apart from the combining grating 14.2. Via the detector elements 16.2a, 16.2b, 16.2c, in the event of a change in the distance z, three periodic distance signals S2_0, S2_120, S2_240 phase-shifted by 120° are detected. The phase relationship between the three distance signals S2_0, S2_120, S2_240 generated is adjusted in a known manner by way of the choice of grating parameters of the combining grating 14.2. This can be done for instance by the suitable choice of the land widths and etching depths, if this grating is embodied as a phase grating.

Also in a known manner, a distance value Z2 regarding the distance between the reflector 20 and the scanning unit 10 can be determined from the distance signals S2_0, S2_120, S2_240. In principle, in this way, the distance to be ascertained between the scanning unit 10 and the reflector and changes in distance between these components are detected.

As can be seen from FIG. 1, to further increase the measurement accuracy, analogously to the above description, the generation of further three phase-shifted distance signals S1_0, S1_120, S1_240, and a further distance value Z1, takes place via the detector elements 16.1a, 16.1b, 16.1c. For that purpose, at the combining location V1 on the scanning plate 17, the measurement beam M2 and the partial reference beam R2 are brought into interfering superposition. Via the three downstream detector elements 16.1a, 16.1b, 16.1c, three more phase-shifted, periodic distance signals S1_0, S1_120, S1_240 are detected in turn, from which a further distance value z1 can be generated.

The periodic distance signals S1_0, S1_120, S1_240 and S2_0, S2_120, S2_240, respectively, present at the two outputs of the device, that is, the respective sets of three detector elements 16.1a, 16.1b, 16.1c and 16.2a, 16.2b, 16.2c have, because of the selected scanning beam paths, signal periods SP_1, SP_2, which are dependent on the tilt angle of the reflector 20 about an axis that is oriented perpendicular to the plane of the drawing. In order to generate a correct distance value Z as independently as possible from this tilt angle, arithmetic averaging of the two distance values Z1, Z2 is necessary. This is done via a signal processing unit 19, indicated in FIG. 2, in accordance with the following equation:

$$Z=(Z1+Z2)/2 \tag{Equation 1}$$

As is clear from the above description of the scanning beam path, in the device of the present invention, after the splitting of the beam generated by the light source 11 via the first splitter 12, the measurement beam and reference beam M2, R2, and the measurement beam and reference beam, M1, R1 that attain interference thus, along the travel distances covered between the first splitter 12 and the combining gratings 14.1, 14.2, each travel the same optical path lengths at the set-point distance. As already mentioned above, the consequence of this is that environmental factors on the distance signals S1_0, S1_120, S1_240 and S2_0, S2_120, S2_240, and thus their wavelength dependency, can be minimized. Any possible measurement error from a tilted reflector can be avoided by way of the generation explained of two distance values Z1, Z2 from the phase-shifted distance signals S1_0, S1_120, S1_240 and S2_0, S2_120, S2_240 and the generation of a corrected distance value Z from the arithmetic averaging of the distance values Z1, Z2.

The scanning unit 10 of the first embodiment of the device of the present invention is shown enlarged in FIG. 2. In this view, besides the scanning plate 17, a substrate element 18 can be seen, on which, besides the six detector elements 16.1a, 16.1b, 16.1c and 16.2a, 16.2b, 16.2c, the light source 11 and the signal processing unit 19 are disposed. In the present example, the light source 11 includes a laser diode 11.1 and upstream of it a collimator lens 11.2; the laser diode emits radiation at the wavelength=785 nm. Alternatively, a suitable LED could for instance be used, instead of the laser diode. The scanning plate 17 already mentioned is also disposed in the scanning unit 10 and essentially includes a transparent glass plate 15, on the top side and underside of which the first and second splitters 12, 13 and the two combining gratings 14.1, 14.2 are disposed. In the present exemplary embodiment, these gratings are each embodied as a transmission diffraction grating, and they have identical grating periods TP_1=TP_2=TP_V.

A second option for how a plurality of phase-shifted distance signals can be generated in the device of the invention will now be explained in terms of the exemplary embodiment shown in FIG. 3.

Figure 3:
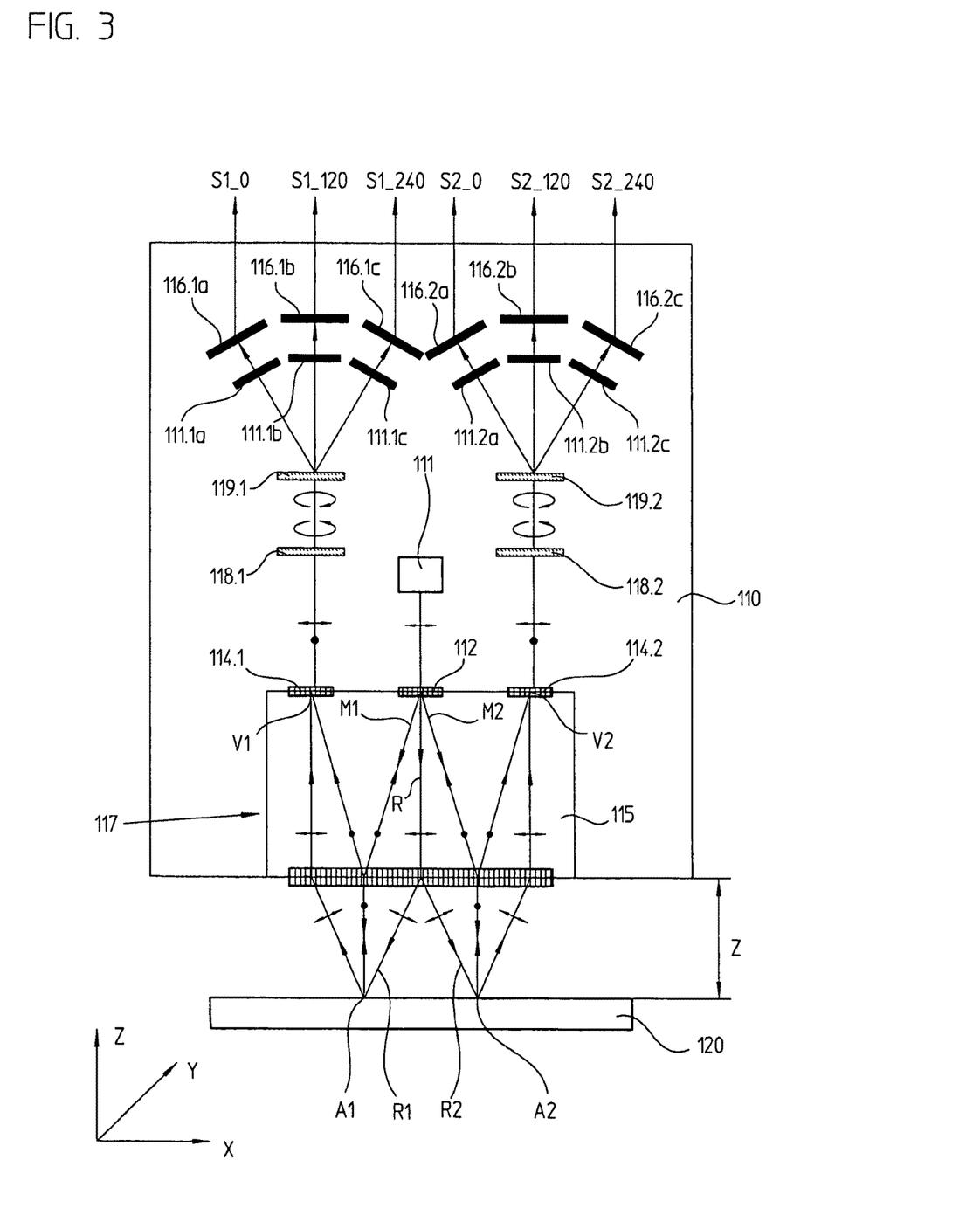
FIG. 3 is a schematic illustration of a second embodiment of a device in accordance with the present invention.

The second embodiment, shown in FIG. 3, of the device of the present invention again includes a scanning unit 110 and a reflector 120, whose distance z is to be determined. Below, essentially only the definitive differences from the first embodiment described will be addressed. These primarily include the manner in which the three phase-shifted distance signals S1_0, S1_120, S1_240 and S2_0, S2_120, S2_240 from the two scanning operations are each generated. In a distinction from the previous variant, so-called polarization-coded generation of the phase-shifted distance signals S1_0, S1_120, S1_240 and S2_0, S2_120, S2_240 is provided.

For that purpose, the beam emitted by the light source 111 is split via the first splitter 112 into one reference beam R and two measurement beams M1, M2. The polarization vectors of the reference beam R on the one hand and the measurement beams M1, M2 on the other are, as indicated in FIG. 3, oriented orthogonally to one another. The first splitter 112, in the form of a transmission diffraction grating, is embodied as a polarizing grating for that purpose. The beams, split by such a grating into a 0th order of diffraction on the one hand and ±1st orders of diffraction on the other, given suitable dimensioning of the grating parameters, have polarization directions oriented orthogonally to one another. With regard to such polarization-selective gratings, see for instance the publication entitled "gratings in the resonance domain as polarizing beam splitters" by M. Schmitz, R. Bräuer, and O. Bryngdahl in Optics Letters, Vol. 20, No. 17, page 1830 (1995).

Once the splitting has taken place via the first splitter 112, the measurement beams M1, M2, the reference beam R, and the partial reference beams R1, R2 are propagated until superposition at the combining gratings 114.1, 114.2 and at the combining locations V1, V2, as in the first embodiment of the device of the present invention described above. By way of the various resultant diffractions and reflections at the various components, as can be seen from FIG. 3 the polarization directions of the various beams no longer change until they are reunited at the combining locations V1, V2. At the combining locations, beams with orthogonally oriented linear polarization therefore meet one another again.

In one possible version of the second exemplary embodiment, the grating periods TP_1, TP_2 and TP_V of the first and second splitters 112, 113 and the combining gratings 114.1, 114.2 are selected identically, in accordance with TP_1=TP_2=TP_V=2 μm.

Of the pairs of orthogonally polarized beams, diffracted in various directions in space downstream of the combining gratings 114.1, 114.2, only the pair that is propagated vertically relative to the combining gratings 114.1, 114.2 is used for obtaining a signal. The corresponding pairs of beams then each travel through a λ/4 plate 118.1, 118.2, which is disposed at an angle of 45° to the polarization directions of the beams that are polarized orthogonally to one another. Via the λ/4 plates 118.1, 118.2, the two linearly polarized beams that are orthogonal to one another are converted into differently circularly polarized beams, from the superposition of which a linearly polarized beam results whose polarization direction is dependent on the phase relationship of the differently circularly polarized beams.

Next, the linearly polarized beam from each of the two scanning operations arrives at a respective splitting grating 119.1, 119.2. The splitting gratings 119.1, 119.2 each split the beams striking them into three orders of diffraction that in terms of intensity are of equal magnitude. Then, the respective detector elements 116.1a, 116.1b, 116.1c and 116.2a, 116.2b, 116.2c, including linear polarization filters 111.1a, 111.1b, 111.1c and 111.2a, 111.2b, 111.2c upstream are disposed in the directions in space of the three orders of diffraction split up. The three polarization filters 111.1a, 111.1b, 111.1c and 111.2a, 111.2b, 111.2c per scanning operation are oriented differently. In the present exemplary embodiment, the polarization filters accordingly have a relative orientation of −60°, 0°, and +60° relative to one another. The result in the case of changes in distance at the detector elements 116.1a, 116.1b, 116.1c and 116.2a, 116.2b, 116.2c is three distance signals S1_0, S1_120, S1_240 and S2_0, S2_120, S2_240, phase-shifted by 120°. The further processing of these distance signals to a tilt angle-corrected distance value z is then done as already described above.

In a further alternative variant with polarization-coded generation of the phase-shifted distance signals S1_0, S1_120, S1_240 and S2_0, S2_120, S2_240, instead of the first splitter embodied in polarizing fashion, a transmission diffraction grating as in the first exemplary embodiment is used. It then exerts no polarization-optical action on the linearly polarized beam arriving from the light source; instead, it only effects the splitting up into the measurement reference beams. Via one additional λ/2 plate, which is disposed on the underside of the scanning plate only in the vicinity of the reference beam, it is accomplished in this variant that the partial reference beam, split up by the second splitter, is rotated by 90° in its polarization. Its polarization direction is in each case again oriented orthogonally to the polarization directions of the two measurement beams. Two compensation plates in the beam paths are also provided, to make the optical paths of the measurement beams and partial reference beams identical at the set-point distance. Via the same beam paths as described above, the two measurement beams and the two partial reference beams are then joined together with orthogonal polarization at the combining locations. The ensuing signal processing and generation of the phase-shifted distance signals is done analogously to the example explained in conjunction with FIG. 3.

In conjunction with the polarization-optical generation of the phase-shifted distance signals, it should also be pointed out in conclusion that it is understood also to be possible to establish other phase relationships among the distance signals. For instance, four distance signals phase-shifted by 90° each can also be generated. For that purpose, four detector elements are each disposed downstream of the splitting gratings 119.1, 119.2, with associated polarization filters, and are each rotated by 45° relative to one another.

A third option for generating a plurality of phase-shifted distance signals in the device of the present invention will be described below in conjunction with FIG. 4.

Figure 4:
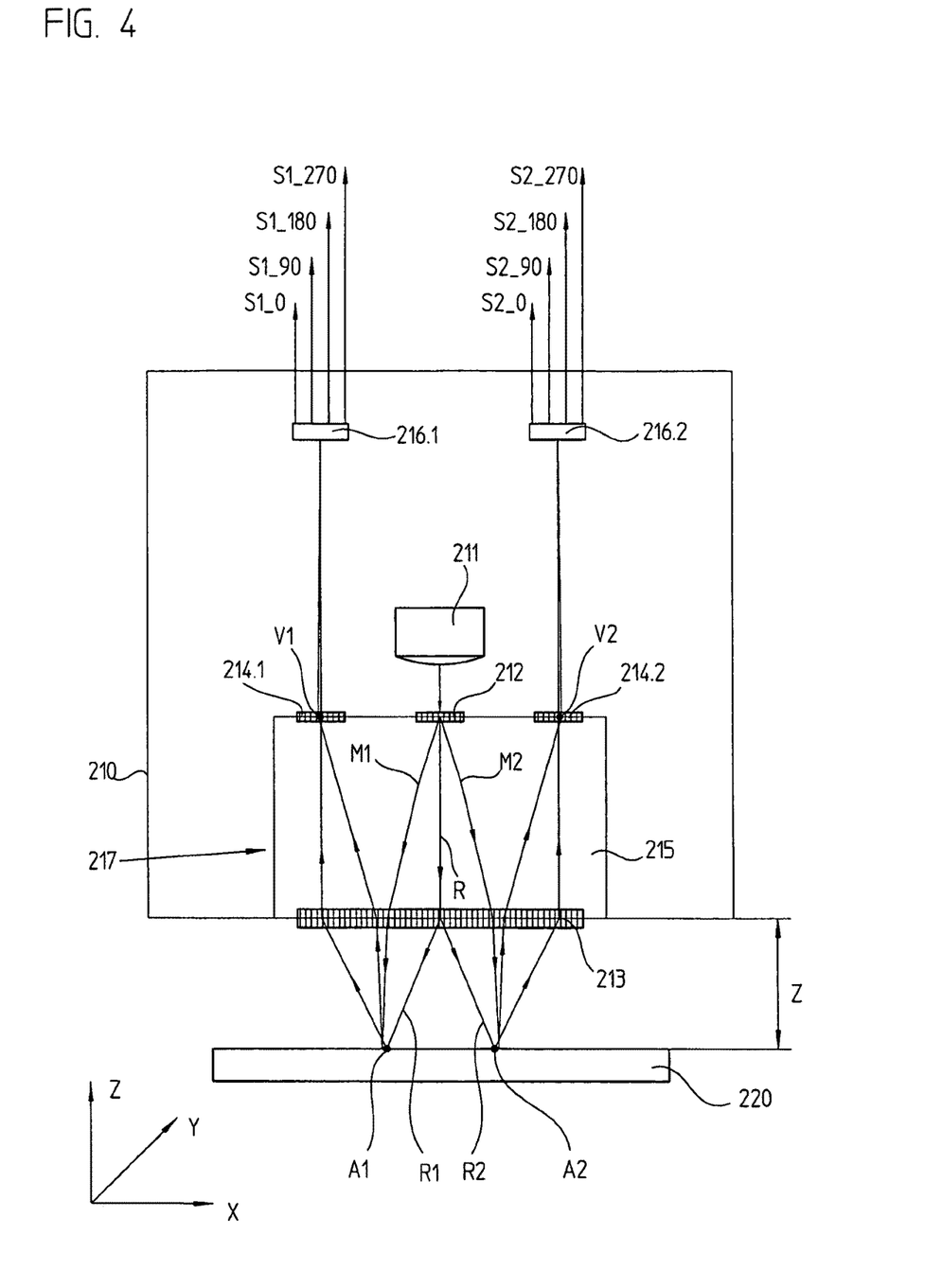
FIG. 4 is a schematic illustration of a third embodiment of a device in accordance with the present invention.

The third embodiment, shown in FIG. 4, of the device of the present invention, like the preceding examples, includes both a scanning unit 210 and a reflector 220, whose distance from one another is to be determined. Once again, essentially only the definitive differences from the two embodiments described above will be addressed below. These differences again include primarily the manner in which the phase-shifted distance signals S1_0, S1_90, S1_180, S1_270 and S2_0, S2_90, S2_180, S2_270 from the two scanning operations are generated. In a distinction from the two preceding variants, it is now provided that a periodic fringe pattern so generated in the plane of the detector elements 216.1, 216.2, on the basis of the so-called vernier principle; the applicable fringe pattern is therefore hereinafter also called the vernier fringe pattern. In the case of a change in distance between the scanning unit 210 and the reflector 220, the vernier fringe pattern generated travels over the detector elements 216.1, 216.2. These elements, in this embodiment of the device of the present invention, are not, as in the other examples, embodied as two-dimensional photoelectric elements but instead as so-called structured photodetectors. This term is understood to mean a periodic arrangement in the x direction of many photoelectric detectors, in which in-phase photoelectric detectors are joined conductively to one another. Within a period A of the vernier fringe pattern generated, four photoelectric detectors are disposed in the present example. The result on the output side is four periodic distance signals S1_0, S1_90, S1_180, S1_270 and S2_0, S2_90, S2_180, S2_270, phase-shifted by 90° each, per detector element

216.1, 216.2. These signals can then, as explained in the first example, be further processed in order to generate a correct distance value Z.

In this variant, what is definitive for the embodiment of the vernier fringe pattern in the detector plane is that in particular the grating period TP_1 of the transmission diffraction grating of the first splitter 212 is embodied slightly differently from the grating period TP_V of the combining gratings 214.1, 214.2. The grating period TP_2 of the transmission diffraction grating of the second splitter 213 is also selected to be different from the two grating periods TP_1, TP_V. In one possible version, the various grating periods TP_2, TP_1, TP_V are selected in accordance with the following equation:

$$TP\_2 > TP\_1 > TP\_V \qquad \text{(Equation 2)}$$

By the suitable choice of the various grating periods TP_2, TP_1, TP_V, the period A of the vernier fringe pattern generated can be established in a fundamentally known manner.

Typical numerical values for one possible exemplary embodiment are approximately as follows:

$$TP\_2 = 4.096\ \mu m$$

$$TP\_1 = 4.089\ \mu m$$

$$TP\_V = 4.057\ \mu m$$

$$\Lambda \approx 500\ \mu m$$

Moreover, the fundamental beam path in this embodiment of the device of the present invention is essentially identical to the beam path that has already been explained in terms of the first example of FIG. 1.

In conclusion, a beam path variant for the device of the invention will be explained in conjunction with FIG. 5; it can fundamentally be implemented with all three of the proposed options for generating phase-shifted distance signals.

This embodiment of the device of the present invention again includes both a scanning unit 310 and reflector 320, whose distance from one another is to be determined. While in the drawing shown, the embodiment of the scanning unit 310 and the beam path shown there are selected to be identical to the foregoing exemplary embodiment of FIG. 4, the reflector 320 in this variant differs from that example.

Thus, the reflector 320 now no longer includes a simple plane mirror onto which the beams arriving from the scanning unit 310 fall. Instead, the reflector includes a transparent substrate body 323, on the top side of which a transmission diffraction grating 321 is mounted, and on the underside of which a reflection layer 322 is mounted.

Figure 5:
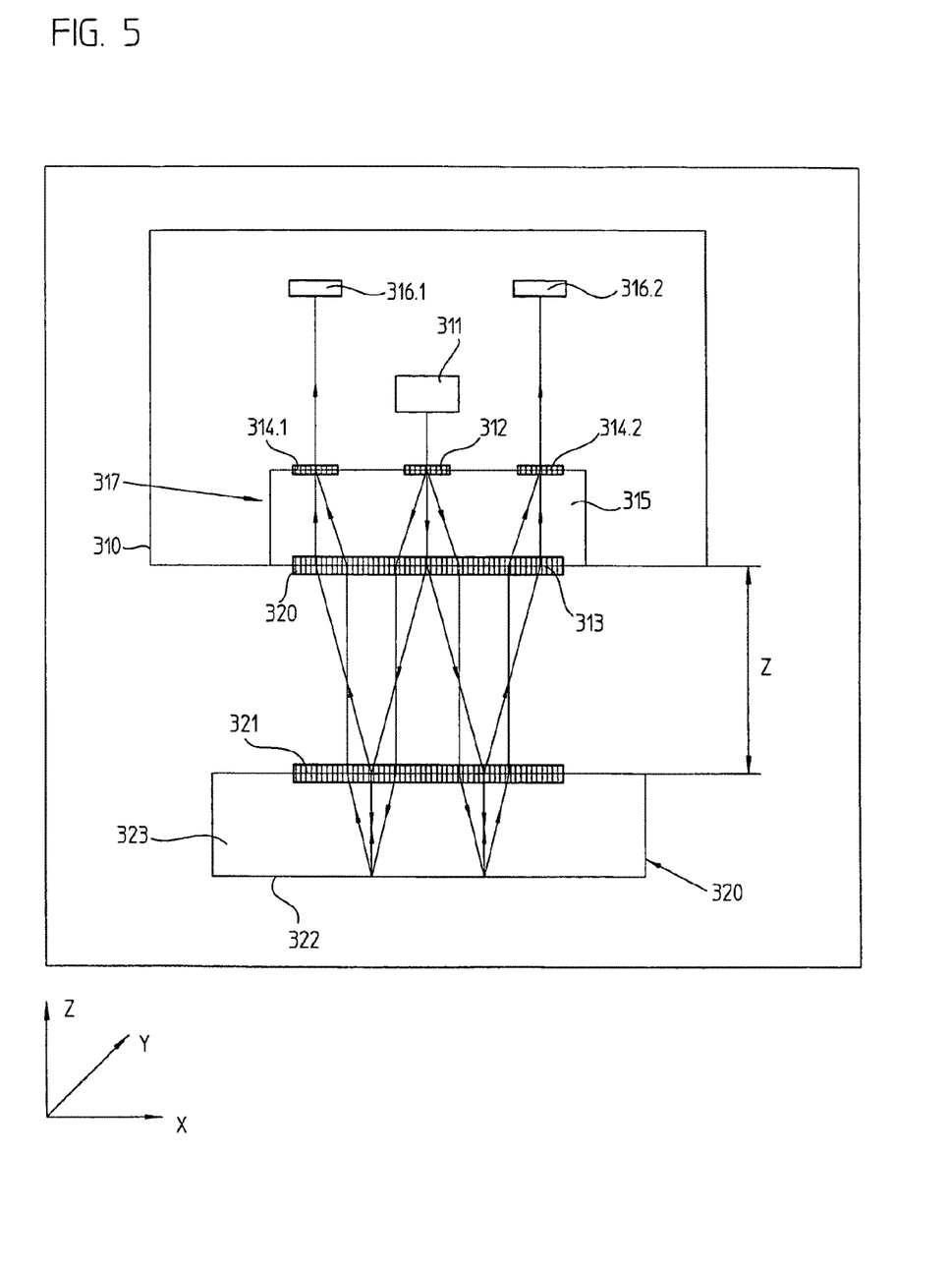
FIG. 5 shows an example of a scanning beam path of a further embodiment of a device in accordance with the present invention, which can be employed in conjunction with the embodiments shown in FIGS. 1-4.

The beams falling from the scanning plate 317 or the scanning unit 310 and used for obtaining signals all pass through the transmission diffraction grating 321 of the reflector 320 twice, as shown in FIG. 5, and in the process are deflected twice into a first order of diffraction. As a result, these beams undergo a two-time phase rotation with different signs, so that even in the event of the possible shifting of the reflector in the x-y plane, an erroneous distance signal will not result.

As an advantage of this kind of reflector embodiment, it should be said first that in this case the scanning plate 315 of the scanning element 317 can be embodied as thinner. In addition, the signal generation is less vulnerable to possible contamination of the reflector 320, since the definitive reflection occurs on the reflection layer 322 located in the interior of the reflector 320. It is furthermore possible to use a reflector embodied in this way in conjunction with a separate scanning head for generating incremental displacement signals in the x-y plane.

The foregoing description is provided to illustrate the present invention, and is not to be construed as a limitation. Numerous additions, substitutions and other changes can be made to the present invention without departing from its scope as set forth in the appended claims.

We claim:

1. A device for interferential distance measurement, comprising:
    a light source that emits a light beam along a propagation direction;
    a scanning plate comprising a splitter that splits said light beam into a measurement beam and a reference beam;
    a reflector disposed spaced-apart in a direction of said propagation direction, wherein said reflector is embodied as a plane mirror and is movable with respect to said scanning plate along an axis which is perpendicular to a surface of said reflector;
    a detector element, wherein said measurement beam and said reference beam are propagated from said splitter along different optical paths toward said reflector, where a back reflection of said measurement beam and said reference beam occurs at said surface of said reflector toward said scanning plate, and wherein at a combining location said measurement beam and said reference beam attain interfering superposition, and wherein said measurement beam and said reference beam interfering at said combining location are detected by said detector element so that said detector element generates a distance signal regarding a distance between said scanning plate and said reflector along said axis; and
    a signal processing unit that has a structure to receive said distance signal from said detector element and determine said distance based on said distance signal.

2. The device as defined by claim 1, wherein said splitter splits said light beam into said measurement beam, a second measurement beam and said reference beam; and said scanning plate comprises a second splitter that splits said reference beam into a first partial reference beam and a second reference beam, wherein said measurement beam, said second measurement beam and said first and second partial reference beams are each propagated toward said reflector, where a back reflection of said measurement beam, said second measurement beam, said first partial reference beam and said second partial reference beam occurs at said reflector toward said scanning plate, and where at said combining location said measurement beam and said first partial reference beam interfere with one another and are detected by said detector element which generates a first signal therefrom and at a second combining location said second measurement beam and said second partial reference beam interfere with one another and are detected by a second detector element which generates a second distance signal regarding a distance between said scanning plate and said reflector, wherein said first distance signal and said second distance signal are used to determine said distance between said scanning plate and said reflector.

3. The device as defined by claim 2, further comprising a signal processing unit that determines a value for said distance between said scanning plate and said reflector, wherein said value is independent of any tilting of said reflector and said value is determined from an arithmetic averaging of values generated from said first distance signal and said second distance signal.

4. The device as defined by claim 3, wherein said light source, said first detector element, said second detector element, said scanning plate and said signal processing unit are arranged in a common area denoted as a scanning unit.

5. The device as defined by claim 2, wherein said first distance signal and said second distance signal are phase-shifted relative to one another.

6. The device as defined by claim 2, wherein said scanning plate comprises a transparent glass plate with a first side nearest to and facing said reflector and a second side opposite to said first side, wherein said splitter is disposed on said second side.

7. The device as defined by claim 6, wherein said second splitter is disposed on said first side.

8. The device as defined by claim 6, wherein said splitter is a transmission diffraction grating.

9. The device as defined by claim 2, wherein said scanning plate comprises a transparent glass plate with a first side nearest to and facing said reflector and a second side opposite to said first side, wherein said second splitter is disposed on said first side.

10. The device as defined by claim 9, wherein said splitter is a transmission diffraction grating and said second splitter is a transmission diffraction grating.

11. The device as defined by claim 2, wherein: said splitter is a grating having a first grating period; said second splitter is a grating having a second grating period; at said combining location, a combining grating having a third grating period is disposed; and said first, second and third grating periods are selected differently from one another such that on said detector element a periodic vernier fringe pattern results.

12. The device as defined by claim 1, further comprising a combining grating that is disposed at said combining location, wherein said combining grating splits said measurement beam and said reference beam that interfere with one another into a plurality of pairs of beams, which are propagated in different directions in space, in each of which directions a respective detector element, including said detector element, is disposed, and a grating parameter of said combining grating is selected such that via said respective detector elements a plurality of phase-shifted distance signals are detectable.

13. The device as defined by claim 1, wherein said splitter is embodied such that said measurement beam and said reference beam split by said splitter are polarized orthogonally to one another.

14. The device as defined by claim 13, wherein said splitter is a polarizing grating.

15. The device as defined by claim 13, further comprising a plurality of further detector elements, wherein between said plurality of further detector elements and said combining location at least one polarizing optical component being arranged such that via said plurality of further detector elements a plurality of phase-shifted distance signals are detectable.

16. The device as defined by claim 15, further comprising a combining grating disposed at said combining location, wherein the following components are disposed between said combining grating and said plurality of further detector elements: a λ/4 plate disposed at an angle of 45° to said measurement beam and said reference beam which are polarized vertically to one another and which attain superposition at said combining grating; a splitting grating positioned downstream of said λ/4 plate, by way of said splitting grating a beam striking it splits into a plurality of partial beams, wherein one of said plurality of partial beams is propagated in a direction toward said detector element; a polarization filter positioned upstream of said detector element, wherein an orientation of said polarization filter is selected such that via said plurality of further detector elements a plurality of phase-shifted distance signals are detectable.

17. A device for interferential distance measurement, comprising:
  a light source that emits a light beam along a propagation direction;
  a scanning plate comprising a splitter that splits said light beam into a measurement beam and a reference beam;
  a reflector disposed spaced-apart in a direction of said propagation direction, wherein said reflector is a transparent substrate body, wherein on a first side of said transparent substrate body facing and positioned nearest said scanning plate a transmission grating is disposed, and on a second side opposite said first side a reflection layer is disposed;
  a detector element, wherein said measurement beam and said reference beam are propagated from said splitter along different optical paths toward said reflector, where a back reflection of said measurement beam and said reference beam occurs at a surface of said first side facing toward said scanning plate, and wherein at a combining location said measurement beam and said reference beam attain interfering superposition, and wherein said measurement beam and said reference beam interfering at said combining location are detected by said detector element so that said detector element generates a distance signal regarding a distance between said scanning plate and said reflector that is measured along a direction perpendicular to said surface; and
  a signal processing unit that has a structure to receive said distance signal from said detector element and determine said distance based on said distance signal.

18. The device as defined by claim 17, wherein said splitter splits said light beam into said measurement beam, a second measurement beam and said reference beam; and said scanning plate comprises a second splitter that splits said reference beam into a first partial reference beam and a second reference beam, wherein said measurement beam, said second measurement beam and said first and second partial reference beams are each propagated toward said reflector, where a back reflection of said measurement beam, said second measurement beam, said first partial reference beam and said second partial reference beam occurs at said reflector toward said scanning plate, and where at said combining location said measurement beam and said first partial reference beam interfere with one another and are detected by said detector element which generates a first signal therefrom and at a second combining location said second measurement beam and said second partial reference beam interfere with one another and are detected by a second detector element which generates a second distance signal regarding a distance between said scanning plate and said reflector, wherein said first distance signal and said second distance signal are used to determine said distance between said scanning plate and said reflector.

19. The device as defined by claim 18, further comprising a signal processing unit that determines a value for said distance between said scanning plate and said reflector, wherein said value is independent of any tilting of said reflector and said value is determined from an arithmetic averaging of values generated from said first distance signal and said second distance signal.

20. The device as defined by claim 19, wherein said light source, said first detector element, said second detector element, said scanning plate and said signal processing unit are arranged in a scanning unit.

21. The device as defined by claim 18, wherein said first distance signal and said second distance signal are phase-shifted relative to one another.

22. The device as defined by claim 18, wherein said scanning plate comprises a transparent glass plate with a first side nearest to and facing said reflector and a second side opposite to said first side, wherein said second splitter is disposed on said first side.

23. The device as defined by claim 22, wherein said splitter is a transmission diffraction grating and said second splitter is a transmission diffraction grating.

24. The device as defined by claim 18, wherein: said splitter is a grating having a first grating period; said second splitter is a grating having a second grating period; at said combining location, a combining grating having a third grating period is disposed; and said first, second and third grating periods are selected differently from one another such that on said detector element a periodic vernier fringe pattern results.

25. The device as defined by claim 17, wherein said scanning plate comprises a transparent glass plate with a first side nearest to and facing said reflector and a second side opposite to said first side, wherein said splitter is disposed on said second side.

26. The device as defined by claim 25, wherein said second splitter is disposed on said first side.

27. The device as defined by claim 25, wherein said splitter is a transmission diffraction grating.

* * * * *